(12) United States Patent
Kapetanovic et al.

(10) Patent No.: US 11,431,387 B2
(45) Date of Patent: Aug. 30, 2022

(54) METHODS AND APPARATUS FOR SIGNAL TRANSMISSION AND RECEPTION IN A WIRELESS COMMUNICATION NETWORK

(71) Applicant: Telefonaktiebolaget LM Ericsson (publ), Stockholm (SE)

(72) Inventors: Dzevdan Kapetanovic, Lund (SE); Pramod Jacob Mathecken, Lund (SE); Thomas Nilsson, Malmo (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 129 days.

(21) Appl. No.: 16/969,489

(22) PCT Filed: Feb. 13, 2018

(86) PCT No.: PCT/EP2018/053590
§ 371 (c)(1),
(2) Date: Aug. 12, 2020

(87) PCT Pub. No.: WO2019/158189
PCT Pub. Date: Aug. 22, 2019

(65) Prior Publication Data
US 2020/0403666 A1    Dec. 24, 2020

(51) Int. Cl.
*H04B 7/0456*      (2017.01)
*H04B 7/0452*      (2017.01)
*H04B 7/06*        (2006.01)

(52) U.S. Cl.
CPC ......... *H04B 7/0456* (2013.01); *H04B 7/0452* (2013.01); *H04B 7/0617* (2013.01); *H04B 7/0634* (2013.01)

(58) Field of Classification Search
CPC .. H04B 7/0456; H04B 7/0452; H04B 7/0617; H04B 7/0634
See application file for complete search history.

(56) References Cited

U.S. PATENT DOCUMENTS

2012/0034874 A1   2/2012   Yiu et al.
2018/0152273 A1   5/2018   Kim et al.

FOREIGN PATENT DOCUMENTS

KR   20160146501 A       12/2016
WO     2016056955 A1      4/2016
WO   WO-2016056955 A1 *   4/2016   ........... H04B 7/0456

OTHER PUBLICATIONS

International Search Report dated Oct. 25, 2018 for International Application No. PCT/EP2018/053590 filed on Feb. 13, 2018, consisting of 14-pages.

(Continued)

*Primary Examiner* — Brenda H Pham
(74) *Attorney, Agent, or Firm* — Christopher & Weisberg, P.A.

(57) ABSTRACT

A broadcast signal transmission occurs concurrently with device-specific, directional transmissions but without substantially interfering with the directional transmissions, based on transmitting the broadcast signal in the null spaces of the directional transmissions. Specifically, transmission of the broadcast signal relies on beamforming precoder values formed from one or more orthonormal basis vectors for the null space of a channel estimate matrix representing the channels between a multi-element antenna array and the wireless devices targeted by the device-specific transmissions. The approach concentrates most of the broadcast signal energy for each subcarrier on a single antenna element for good broadcast-signal coverage while still yielding a beamforming solution that substantially avoids broadcast-signal interference at the devices targeted for directional transmission.

16 Claims, 4 Drawing Sheets

(56) References Cited

OTHER PUBLICATIONS

Wu Bo-Xian et al; HybridCast: Joint Multicast-Unicast Design for Multiuser MIMO Networks; 2015 IEEE Conference on Computer Communications (INFOCOM); Apr. 26, 2015, consisting of 9-pages.

* cited by examiner

ASSIGNMENT TABLE FOR APPLICATION OF HUNGARIAN ALGORITHM

| | Subcarrier 1 | ... | Subcarrier $N$ |
|---|---|---|---|
| Antenna Element 1 | $q_{1,1}$ | ... | $q_{1,N}$ |
| ... | ... | ... | ... |
| Antenna Element $M$ | $q_{M,1}$ | ... | $q_{M,N}$ |

FOR EACH SUBCARRIER, TENTATIVELY ASSIGN THE SUBCARRIER TO EACH ANTENNA ELEMENT AND DETERMINE A LINEAR COMBINATION OF ORTHONORMAL (NULL SPACE) BASIS VECTORS THAT MAXIMIZES THE CONCENTRATION OF BROADCAST SIGNAL ENERGY ON THE TENTATIVELY ASSIGNED ELEMENT, WITHOUT EXCEEDING A TRANSMIT POWER LIMIT
602

IDENTIFY A SUBSET OF (REMAINING) TENTATIVE ASSIGNMENTS THAT MAXIMIZES THE SUM OF BROADCAST SIGNAL ENERGY CONCENTRATIONS DETERMINED FOR THE TENTATIVE ASSIGNMENTS
604

FINALIZE ASSIGNEMENTS FOR THE IDENTIFIED SUBSET AND PROGRESS TO NEXT ASSIGMENT ITERATION
606

FINALIZE TENTATIVE ASSIGNMENTS (REPEAT FOR $c$ ITERATIONS)

FIG. 6

METHODS AND APPARATUS FOR SIGNAL TRANSMISSION AND RECEPTION IN A WIRELESS COMMUNICATION NETWORK

CROSS-REFERENCE TO RELATED APPLICATIONS

This application is a Submission Under 35 U.S.C. § 371 for U.S. National Stage Patent Application of International Application Number: PCT/EP2018/053590, filed Feb. 13, 2018 entitled "METHODS AND APPARATUS FOR SIGNAL TRANSMISSION AND RECEPTION IN A WIRELESS COMMUNICATION NETWORK," the entirety of which is incorporated herein by reference.

TECHNICAL FIELD

The present invention relates to wireless communication networks and specifically relates to beamformed wireless transmissions.

BACKGROUND

The use of multi-antenna transmission and reception schemes, including Massive Multiple-Input-Multiple-Output (MIMO) schemes, represent a key aspect of enabling the new radio (NR) interfaces contemplated for use in Fifth Generation (5G) communication networks, and may be deployed for use in Wireless Local Area Networks (WLANs) under IEEE standardization. Among its several advantages, Massive MIMO provides for the formation of narrow transmit beams that cause little inter-beam interference and extend coverage by forming directional beams targeted to specific wireless devices operating within the geographic coverage area(s) of the network.

Transmitting broadcast signals in Massive MIMO systems, however, raises numerous challenges. Broadcast signals have been used in cellular technology for a long time, and they are also expected to be an important feature for supporting the deployment of Internet-of-Things (IoT) devices. Broadcast signals, for example, may be used to trigger multiple low-power, geographically dispersed IoT devices.

SUMMARY

A broadcast signal transmission occurs concurrently with device-specific, directional transmissions but without substantially interfering with the directional transmissions, based on transmitting the broadcast signal in the null spaces of the directional transmissions. Specifically, transmission of the broadcast signal relies on beamforming precoder values formed from one or more orthonormal basis vectors for the null space of a channel estimate matrix representing the channels between a multi-element antenna array and the wireless devices targeted by the device-specific transmissions. The approach concentrates most of the broadcast signal energy for each subcarrier on a single antenna element for good broadcast-signal coverage while still yielding a beamforming solution that substantially avoids broadcast-signal interference at the devices targeted for directional transmission.

In one embodiment, a method of operation at a node in a wireless communication network includes estimating channels between elements of an antenna array and one or more first wireless communication devices that are targeted for directional transmission of corresponding device-specific signals on subcarriers in a set of subcarriers. For each subcarrier in the set of subcarriers, the method further includes generating first beamforming precoder values for distributing the signal energy of the device-specific signals across the elements of the antenna array for directional transmission of the device-specific signals, the first beamforming precoder values being generated from a channel estimate matrix representing the estimated channels. Still further, the method includes generating second beamforming precoder values for concentrating the signal energy of a broadcast signal not targeted to any specific wireless communication device on an assigned one of the elements comprising the antenna array, the second beamforming precoder values being determined from one or more orthonormal basis vectors for the null space of the channel estimate matrix, for attenuation of the broadcast signal in directions corresponding to the directional transmission of the device-specific signals. The method further includes forming a combined signal for transmission from the antenna array, as a combination of the product of the first beamforming precoder values and the device-specific signals and the product of the second beamforming precoder values and the broadcast signal, and transmitting the combined signals formed for the corresponding subcarriers in the set of subcarriers from the antenna array.

In another example embodiment, a node configured for operation in a wireless communication network includes communication circuitry configured for transmitting from an antenna array, and processing circuitry operatively associated with the communication circuitry. The processing circuitry is configured to estimate channels between elements of the antenna array and one or more first wireless communication devices that are targeted for directional transmission of corresponding device-specific signals on subcarriers in a set of subcarriers. Further, for each subcarrier in the set of subcarriers, the processing circuitry is configured to generate first beamforming precoder values for distributing the signal energy of the device-specific signals across the elements of the antenna array for directional transmission of the device-specific signals, the first beamforming precoder values being generated from a channel estimate matrix representing the estimated channels. Further, for each subcarrier, the processing circuitry is configured to generate second beamforming precoder values for concentrating the signal energy of a broadcast signal not targeted to any specific wireless communication device on an assigned one of the elements comprising the antenna array, the second beamforming precoder values being determined from one or more orthonormal basis vectors for the null space of the channel estimate matrix, for attenuation of the broadcast signal in directions corresponding to the directional transmission of the device-specific signals. Still further, the processing circuitry is configured to form a combined signal for transmission from the antenna array (14), as a combination of the product of the first beamforming precoder values and the device-specific signals and the product of the second beamforming precoder values and the broadcast signal, and transmit the combined signals formed for the corresponding subcarriers in the set of subcarriers from the antenna array.

In another example embodiment, a node configured for operation in a wireless communication network includes a channel estimation module configured to estimate channels between elements of an antenna array and one or more first wireless communication devices that are targeted for directional transmission of corresponding device-specific signals on subcarriers in a set of subcarriers. Further modules in the node include a first precoder generation module configured to, for each subcarrier in the set of subcarriers, generate first beamforming precoder values for distributing the signal energy of the device-specific signals across the elements of the antenna array for directional transmission of the device-specific signals, the first beamforming precoder values being generated from a channel estimate matrix representing the estimated channels. The node also includes a second precoder generation module configured to, for each subcarrier in the set of subcarriers, generate second beamforming precoder values for concentrating the signal energy of a broadcast signal not targeted to any specific wireless communication device on an assigned one of the elements comprising the antenna array, the second beamforming precoder values being determined from one or more orthonormal basis vectors for the null space of the channel estimate matrix, for attenuation of the broadcast signal in directions corresponding to the directional transmission of the device-specific signals. Still further, the node includes a forming module configured to form a combined signal for transmission from the antenna array, as a combination of the product of the first beamforming precoder values and the device-specific signals and the product of the second beamforming precoder values and the broadcast signal, and a transmission module configured to transmit the combined signals formed for the corresponding subcarriers in the set of subcarriers from the antenna array (14).

In yet another example embodiment, a computer program product comprises program instructions that, when executed by one or more processors of a node configured for operation in a wireless communication network, configures the node to estimate channels between elements of an antenna array and one or more first wireless communication devices that are targeted for directional transmission of corresponding device-specific signals on subcarriers in a set of subcarriers. For each subcarrier in the set of subcarriers, the node is configured to generate first beamforming precoder values for distributing the signal energy of the device-specific signals across the elements of the antenna array for directional transmission of the device-specific signals, the first beamforming precoder values generated from a channel estimate matrix representing the estimated channels, and to generate second beamforming precoder values for concentrating the signal energy of a broadcast signal not targeted to any specific wireless communication device on an assigned one of the elements comprising the antenna array. The second beamforming precoder values are determined from one or more orthonormal basis vectors for the null space of the channel estimate matrix, for attenuation of the broadcast signal in directions corresponding to the directional transmission of the device-specific signals, and the computer program product further includes program instructions that configure the node to form a combined signal for transmission from the antenna array, as a combination of the product of the first beamforming precoder values and the device-specific signals and the product of the second beamforming precoder values and the broadcast signal, and transmit the combined signals formed for the corresponding subcarriers in the set of subcarriers from the antenna array.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
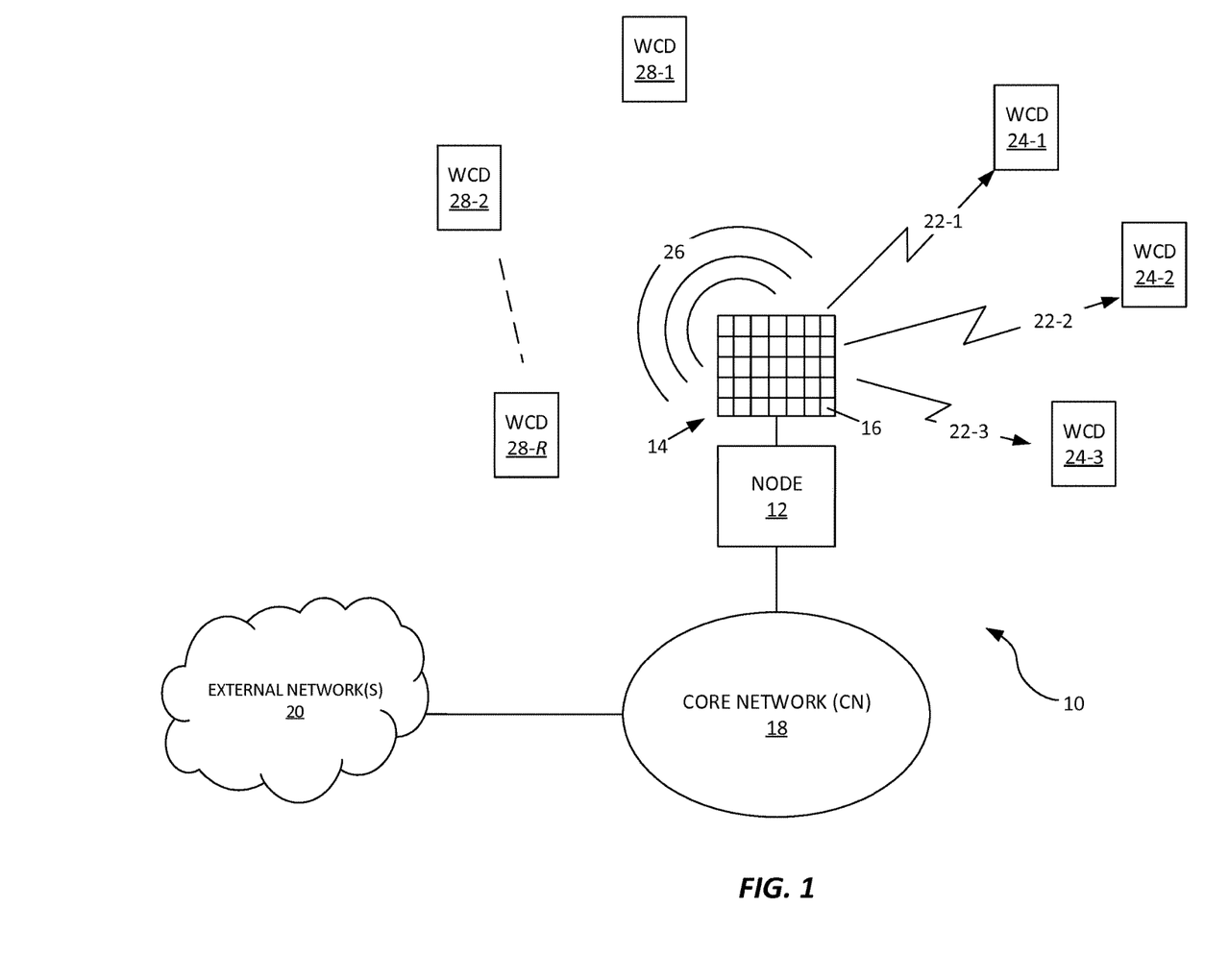
FIG. 1 is a block diagram of one embodiment of a wireless communication network, including a node configured for beamforming wireless transmissions.

FIG. 1 illustrates an example embodiment of a wireless communication network 10 that includes a node 12 configured for transmitting from an antenna array 14 comprising a plurality of antenna elements 16. The antenna array 14 comprises a potentially large plurality of elements 16 and, by way of non-limiting example, may comprise a uniform linear array of half-wavelength spaced elements, or may comprise another arrangement that use non-equidistant element spacing.

The network 10 includes a core network 18, denoted as CN 18 in the illustration, which communicatively couples to one or more external networks 20, such as the Internet. In at least one example embodiment, the network 10 uses Massive MIMO or other beamforming techniques to transmit directional, device-specific signals 22, also referred to as directional beams, with each device-specific signal 22 being device-specific in the sense that it is targeted for reception by a particular wireless communication device 24, where "WCD" in the diagram denotes a wireless communication device. Merely as an example, FIG. 1 illustrates three such "first" wireless communication devices 24-1, 24-2, and 24-3, and three corresponding directional, device-specific signals 22-1, 22-2, and 22-3.

Advantageously, the node 12 is configured for operation in a manner that allows it to transmit a broadcast signal 26 while transmitting the device-specific signals 22 and without causing substantial broadcast-signal interference at the first wireless communication devices 24 targeted by the device-specific signals 22. In some sense, the node 12 uses "just enough" beamforming for the broadcast signal transmission to null the broadcast signal 26 in directions corresponding to the device-specific signals 22. Such an arrangement allows other wireless communication devices 28 variously located within a broadcast-signal range of the node 12 to receive the broadcast signal. For labeling convenience, these other wireless communication devices 28 may be referred to a "second" wireless communication devices 28, to distinguish them from the first wireless communication devices 24, with FIG. 1 offering an example scenario of multiple second wireless communication devices 28-1, 28-2, through 28-R.

A point worth appreciating is that while FIG. 1 depicts the second wireless communication devices 28 on one side of the diagram while depicting the first wireless communication devices 24 on the other side of the diagram, more complex and challenging spatial arrangements of first and second wireless communication devices 24 and 28 are directly accommodated by the beamforming transmission control detailed herein. Even in cases where one or more second wireless devices 28 fall within the vertical or azimuthal device-specific beam directions associated with one or more of the device-specific signals 22, the broadcast signal 26 is available for reception at other second wireless devices 28 that lie outside of the device-specific beam directions.

Figure 2:
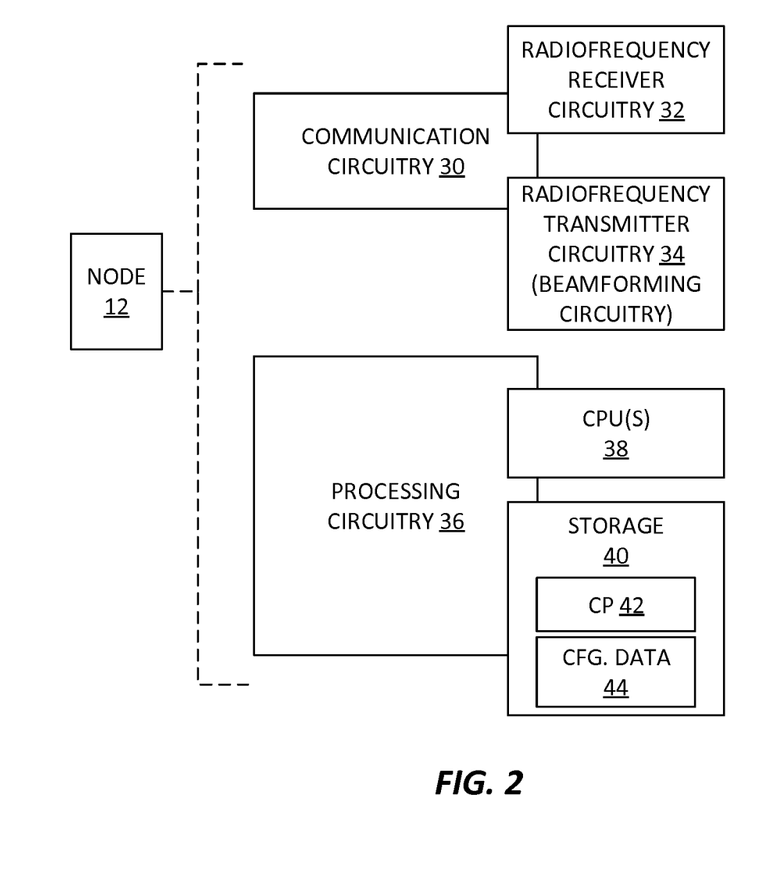
FIG. 2 is a block diagram of example details according to one or more embodiments of the node introduced in FIG. 1.

FIG. 2 depicts example implementation details for the node 12, which, for example, comprises a radio base station, such as an eNB in the Long Term Evolution (LTE) context or a gNB in the 5G New Radio (NR) context. Those skilled in the art will recognize the depicted example as non-limiting, as the functionality of interest may be realized using other physical and functional circuitry arrangements. With these qualifiers in mind, the example node 12 includes communication circuitry 30, which in one or more embodiments includes radiofrequency receiver circuitry 32 and radiofrequency transmitter circuitry 34, where at least the transmitter circuitry 34 includes beamforming circuitry for beamforming from an antenna array, such as the example array seen in FIG. 1.

The example node 12 further includes processing circuitry 36, which may comprise one or more Central Processing Units (CPUs) 38, along with supporting storage 40. The storage 40 comprises one or more types of computer-readable media, such as a combination of one or more types of long-term storage and one or more types of dynamic or working storage. In an example implementation, the storage 40 comprises one or more types of non-volatile storage, such as Solid State Disk, hard disk, FLASH, etc., and one or more types of volatile storage, such as Static RAM, Dynamic RAM, etc.

Broadly, the processing circuitry 36 should be understood as comprising fixed, dedicated circuitry or programmatically-configured circuitry, or some combination of fixed circuitry and programmatically-configured circuitry. In one or more embodiments, for example, the processing circuitry 36 comprises one or more microprocessors, microcontrollers, Digital Signal Processors (DSPs), Application Specific Integrated Circuits (ASICs), Field Programmable Gate Arrays (FPGAs), or other digital processing circuits that are specially adapted—configured—to operate as described herein, based on their execution of computer program instructions comprising one or more computer programs stored in the storage 40. As an example of such an arrangement, FIG. 2 depicts the storage 40 as storing one or more computer programs, denoted as CP 42 in the diagram, along with configuration data 44, which may comprise preconfigured information, dynamically configured information, or a mix thereof.

In a first detailed example embodiment, the communication circuitry 30 of the node 12 is configured for transmitting from an antenna array 14, and the processing circuitry 36 is operatively associated with the communication circuitry 30 and configured to estimate channels between elements 16 of the antenna array 14 and one or more first wireless communication devices 24 that are targeted for directional transmission of corresponding device-specific signals 22 on subcarriers in a set of subcarriers. For example, the processing circuitry 36 estimates the composite K×M downlink channel based on its evaluation of K uplink signals received from respective ones among K first wireless communication devices 24 targeted for directional, device-specific signal transmissions, with M elements 16 in the antenna array 14 available for use in beamforming.

Such estimation may be done for each subcarrier j, where $j \in \{1, 2, \ldots, N\}$, with N equaling the total number of subcarriers. In an example case, the set of subcarriers includes 1024 subcarriers, while the antenna array 14 includes 100 elements 16. However, no limitations are implied or intended by the example case.

For each subcarrier in the set of subcarriers, the processing circuitry 36 is configured to generate first beamforming precoder values for distributing the signal energy of the device-specific signals across the elements 16 of the antenna array 14 for directional transmission of the device-specific signals. The first beamforming precoder values are generated from a channel estimate matrix representing the estimated channels to the first wireless communication devices 24 that are targeted by the device-specific signals 22. Here, it will be understood that "beamforming precoder values" comprise, e.g., complex coefficients defining the amplitude and phase values that control the transmission of signal energy from individual elements 16 of the antenna array 14. Thus, for a data signal to be directionally transmitted to the k-th one of K first wireless communication devices 24, the processing circuitry 36 computes first beamforming precoder values for each subcarrier j, to control the distribution of the data signal energy across the M antenna elements, to achieve the desired directional beam transmission.

Further, for each subcarrier in the set of subcarriers, the processing circuitry 36 is configured to generate second beamforming precoder values for concentrating the signal energy of a broadcast signal 26 not targeted to any specific wireless communication device 24 or 28 on an assigned one of the elements 16 comprising the antenna array 14. The second beamforming precoder values are determined from one or more orthonormal basis vectors for the null space of the channel estimate matrix (representing the composite channel to the first wireless communication devices 24), for attenuation of the broadcast signal 26 in directions corresponding to the directional transmission of the device-specific signals 22.

Generation of the second beamforming precoder values reflects the advantageous recognition that transmitting all the signal energy of the broadcast signal 26 for the j-th subcarrier from a single antenna element 16 would achieve the broadest radiative pattern for the broadcast signal but would not avoid interfering with reception of the device-specific signals 22 at respective ones of the first wireless communication devices 24. In some sense, the second beamforming precoder values compromise, by placing most but not all the broadcast signal energy for the j-th subcarrier on the assigned antenna element 16, while using the remaining signal energy for transmitting from one or more remaining ones of the antenna elements 16, to null the broadcast signal 26 in the beam direction(s) used for the device-specific signals 22. The extent of concentration achievable depends several variables or factors, including the beamforming capabilities of the node 12, the number of first wireless communication devices 24 currently being served via device-specific signals 22, and the spatial arrangement and distribution of those devices 24 within the coverage area of the node 12. Thus, the technique should be understood as the purposeful attempt to concentrate as much broadcast signal energy as possible on an assigned antenna element 16, using the above-described orthonormal basis vectors for generating the second beamforming precoder values.

The processing circuitry 36 is further configured to form a combined signal for transmission from the antenna array 14, as a combination of the product of the first beamforming precoder values and the device-specific signals 22 and the product of the second beamforming precoder values and the broadcast signal 26. Such operations will be understood as forming a combined signal for each subcarrier j, i.e., the weighted values of the device-specific signals 22 for the j-th subcarrier and the weighted values of the broadcast signal 26 for the j-th subcarrier. Correspondingly, the processing circuitry 36 is configured to transmit the combined signals formed for the corresponding subcarriers in the set of subcarriers from the antenna array 14.

In an example embodiment, or in an example case, the processing circuitry 36 is configured to generate the second beamforming precoder values by selecting a respective orthonormal basis vector from a set of orthonormal basis vectors for the null space of the channel estimate matrix. That is, for each subcarrier j, there is a K×M channel estimate matrix representing the composite channel between each antenna element 16 and each first wireless communication device 24 targeted by a corresponding one of the directionally-transmitted, device-specific signals 22, and the set of orthonormal basis vectors represents the null space of the channel estimate matrix. Each column in the set of orthonormal basis vectors represents a broad beam that concentrates the broadcast signal energy for the j-th subcarrier on one of the elements 16 in the antenna array, while still distributing the remaining broadcast signal energy of the j-th subcarrier across one or more other antenna elements 16, for nulling the broadcast-signal transmission in the beam direction(s) associated with the device-specific signals 22.

To the extent that there are more subcarriers than there are antenna elements 16, there will be two or more subcarriers assigned to at least one of the antenna elements 16, where "assigned" here means the antenna element 16 on which the broadcast signal energy for the j-th subcarrier is concentrated. In an example of managing such assignments, the processing circuitry 36 in one or more embodiments is, over the set of subcarriers, configured to select respective orthonormal basis vectors in order, in round-robin fashion with respect to the set of orthonormal basis vectors. For example, the processing circuitry 36 assigns a "first" one of the subcarriers to a "first" one of the antenna elements 16 and assigns a "second" one of the subcarriers to a "second" one of the antenna elements 16, with the assignments progressing through the "last" antenna element 16, at which point the processing circuitry 36 returns to the first antenna element 16.

In the above context, it is helpful to appreciate that at least for antenna arrays 14 with larger numbers of antenna elements 16, each orthonormal basis vector characteristically has a dominant vector element. Because the complex coefficient comprising each vector element corresponds to a specific one of the antenna elements 16 in the antenna array, the dominant vector element inherently represents a concentration of signal energy on the corresponding antenna element. Thus, to concentrate the broadcast signal energy for the j-th subcarrier, the processing circuitry 36 may be configured to select the orthonormal basis vector whose corresponding vector element is dominant. However, in at least some embodiments, or under at least some operational scenarios, the processing circuitry 36 is configured to "improve" the generation process for the second beamforming precoder values.

In one such example, the processing circuitry 36 is configured to generate the second beamforming precoder values for concentrating the signal energy of the broadcast signal 26 on an assigned one of the elements 16 in the antenna array 14 by, for each subcarrier in the set of subcarriers, calculating a linear combination of orthonormal basis vectors from a set of orthonormal basis vectors for the null space of the channel estimate matrix. For reference, see Coleman, T. F. & Sorensen, D. C., *A note on the computation of an orthonormal basis for the null space of a matrix*, Mathematical Programming (1984) 29: 234, or Foster, L., *Rank and null space calculations using matrix decomposition without column interchanges*, Linear Algebra and its Applications, Volume 74, February 1986, pp. 47-71. The linear combination is calculated so as to maximize the concentration of broadcast signal energy on the assigned element 16, without exceeding a transmit power limit applicable to each subcarrier. For example, the processing circuitry (36) is configured to identify the linear combination of orthonormal basis vectors based on determining:

$$\max_y (e_m V_{j,null}^D y_j)^H (e_m V_{j,null}^D y_j)$$

$$\text{subject to } y_j^H y_j \le P,$$

where "H" denotes the Hermitian operator, $e_m$ is a 1×M vector with m representing the assigned element 16 from a total of M elements 16 comprising the antenna array 14, $V_{j,null}^D$ is an M×(M−K) matrix whose "D" superscript denotes "device-specific" and whose columns are an orthonormal basis for the null space of the channel estimate matrix, K denotes the number of one or more first wireless communication devices 24 for which device-specific signals 22 are to be directionally transmitted, P is the transmit power limit, and $y_j$ is an (M−K)×1 vector of combining weights to be determined, for forming the second beamforming precoder values as a linear combination of basis vectors from $V_{j,null}^D$. Here, the second beamforming precoder values may be denoted as $w_j$ and are given by $w_j = V_{j,null}^D y_j$, which yields an M×1 vector of vector elements. Each m-th element of $w_j$ is a complex coefficient representing the second beamforming precoder value used for transmitting the broadcast signal 26 on the j-th subcarrier from the m-th antenna element 16.

As a further refinement implemented in one or more embodiments or operational cases, the processing circuitry 36 is configured to determine the "best" subcarrier-to-antenna-element assignments. That is, rather than assigning the j-th subcarrier to the m-th antenna element 16 and then determining the linear combination of orthonormal basis vectors that yields the greatest broadcast-signal energy concentration on the assigned antenna element 16, the processing circuitry 36 may be configured to determine the assignments in a manner that is optimized with respect to a defined cost or metric.

In one such embodiment or operational case, for each subcarrier, the processing circuitry 36 is configured to determine the subcarrier-to-antenna element assignments by, for each subcarrier, tentatively assigning the subcarrier to each element 16 of the antenna array 14 and, for each tentatively-assigned element 16, determining a linear combination of orthonormal basis vectors from a set of orthonormal basis vectors for the null space of the channel estimate matrix that maximizes the concentration of broadcast signal energy on the tentatively-assigned element 16. The processing circuitry 36 constrains the maximization by a transmit power limit applicable to each subcarrier.

The processing circuitry 36 is further configured to finalize the tentative assignments by assigning subcarriers to elements 16 in a way that maximizes the sum of the broadcast signal energy concentrations determined for the tentative assignments. In other words, the processing circuitry 36 makes assignments that maximize the broadcast-signal energy concentrations. For example, the processing circuitry 36 determines the assignments that maximize the sum of the broadcast signal energy concentrations across the elements 16, based on solving a subcarrier-to-element assignment problem by applying a combinatorial optimization algorithm. The processing circuitry 36 may be further configured to apply the combinatorial optimization algorithm in such a way that yields substantially the same number of subcarriers assigned to each element 16 in the antenna array 14, so that each element 16 radiates substantially the same average power with respect to the broadcast signal 26.

As for other interesting aspects of its operation, in one or more embodiments, for each subcarrier j, the processing circuitry 36 is configured to form the corresponding combined signal as $$x_j = F_j d_j + w_j b_j$$

where $F_j$ denotes the first beamforming precoder values for the j-th subcarrier in the set of subcarriers, $d_j$ denotes a vector of device-specific symbols for transmission to the one or more first wireless communication devices 24 on the j-th subcarrier, $w_j$ denotes the second beamforming precoder values for the j-th subcarrier, and $b_j$ denotes a broadcast symbol for transmission on the j-th subcarrier. Further, the processing circuitry 36 is configured to generate the first beamforming precoder values $F_j$ by calculating the first beamforming precoder values based on a composite channel matrix $H_j^D$ representing the composite channel between each first wireless communication device 24 and respective elements 16 in the antenna array 14. Still further, the processing circuitry 36 is configured to generate the second beamforming precoder values by selecting a basis vector or a linear combination of basis vectors, from a set of orthonormal basis vectors for the null space of the composite channel matrix $H_j^D$.

Figure 3:
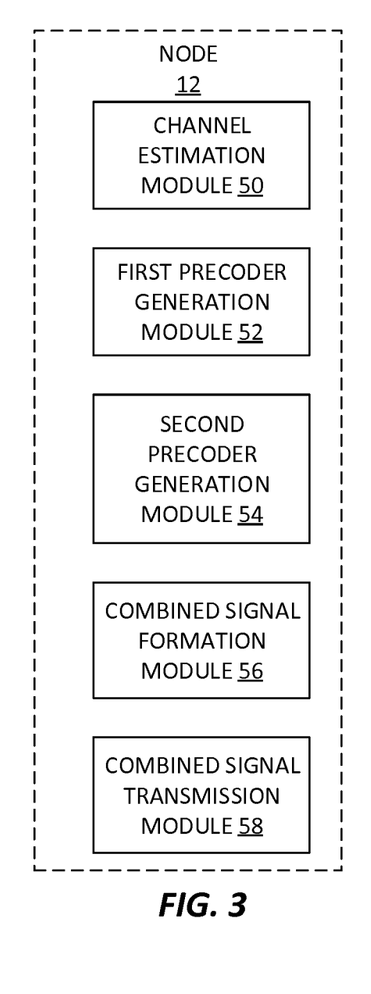
FIG. 3 is a block diagram of example details according to one or more further embodiments of the node introduced in FIG. 1.

FIG. 3 depicts another embodiment of the node 12. In the depicted example, the node 12 includes a channel estimation module 50 configured to estimate channels between elements 16 of an antenna array 14 and each of one or more first wireless communication devices 24 that are targeted for directional transmission of corresponding device-specific signals 22 on subcarriers in a set of subcarriers. The node 12 further includes a first precoder generation module 52 configured to, for each subcarrier in the set of subcarriers, generate first beamforming precoder values for distributing the signal energy of the device-specific signals across the elements 16 of the antenna array 14 for directional transmission of the device-specific signals, the first beamforming precoder values being generated from a channel estimate matrix representing the estimated channels.

The node 12 additionally includes a second precoder generation module 54 configured to, for each subcarrier in the set of subcarriers, generate second beamforming precoder values for concentrating the signal energy of a broadcast signal not targeted to any specific wireless communication device 24, 28 on an assigned one of the elements 16 in the antenna array 14, the second beamforming precoder values being determined from one or more orthonormal basis vectors for the null space of the channel estimate matrix, for attenuation of the broadcast signal 26 in directions corresponding to the directional transmission of the device-specific signals 22. Still further, the node 12 includes a formation module 56 configured to form a combined signal for transmission from the antenna array 14, as a combination of the product of the first beamforming precoder values and the device-specific signals and the product of the second beamforming precoder values and the broadcast signal, and a transmission module 58 configured to transmit the combined signals formed for the corresponding subcarriers in the set of subcarriers from the antenna array 14.

Another embodiment involves a computer program product, e.g., one or more computer programs 42 stored non-transitorily in the storage 40 or stored in another computer-readable medium. The computer program product includes program instructions that, when executed by one or more CPUs 38 or other processors of a node 12 configured for operation in a wireless communication network 10, configures the node 12 to estimate channels between elements 16 of an antenna array 14 and one or more first wireless communication devices 24 that are targeted for directional transmission of corresponding device-specific signals 22 on subcarriers in a set of subcarriers. The computer program product further configures the node 12 to, for each subcarrier in the set of subcarriers, generate first beamforming precoder values for distributing the signal energy of the device-specific signals 22 across the elements 16 of the antenna array 14 for directional transmission of the device-specific signals, the first beamforming precoder values generated from a channel estimate matrix representing the estimated channels. Still further, the computer program product configures the node 12 to, for each subcarrier in the set of subcarriers, generate second beamforming precoder values for concentrating the signal energy of a broadcast signal 26 not targeted to any specific wireless communication device 24, 28 on an assigned one of the elements 16 comprising the antenna array 14, the second beamforming precoder values being determined from one or more orthonormal basis vectors for the null space of the channel estimate matrix, for attenuation of the broadcast signal 26 in directions corresponding to the directional transmissions of the device-specific signals 22. Further, the computer program product configures the node 12 to form a combined signal for each subcarrier, for transmission from the antenna array 14, as a combination of the product of the first beamforming precoder values and the device-specific signals 22 and the product of the second beamforming precoder values and the broadcast signal 26, and transmit the combined signals formed for the corresponding subcarriers in the set of subcarriers from the antenna array 14.

Figure 4:
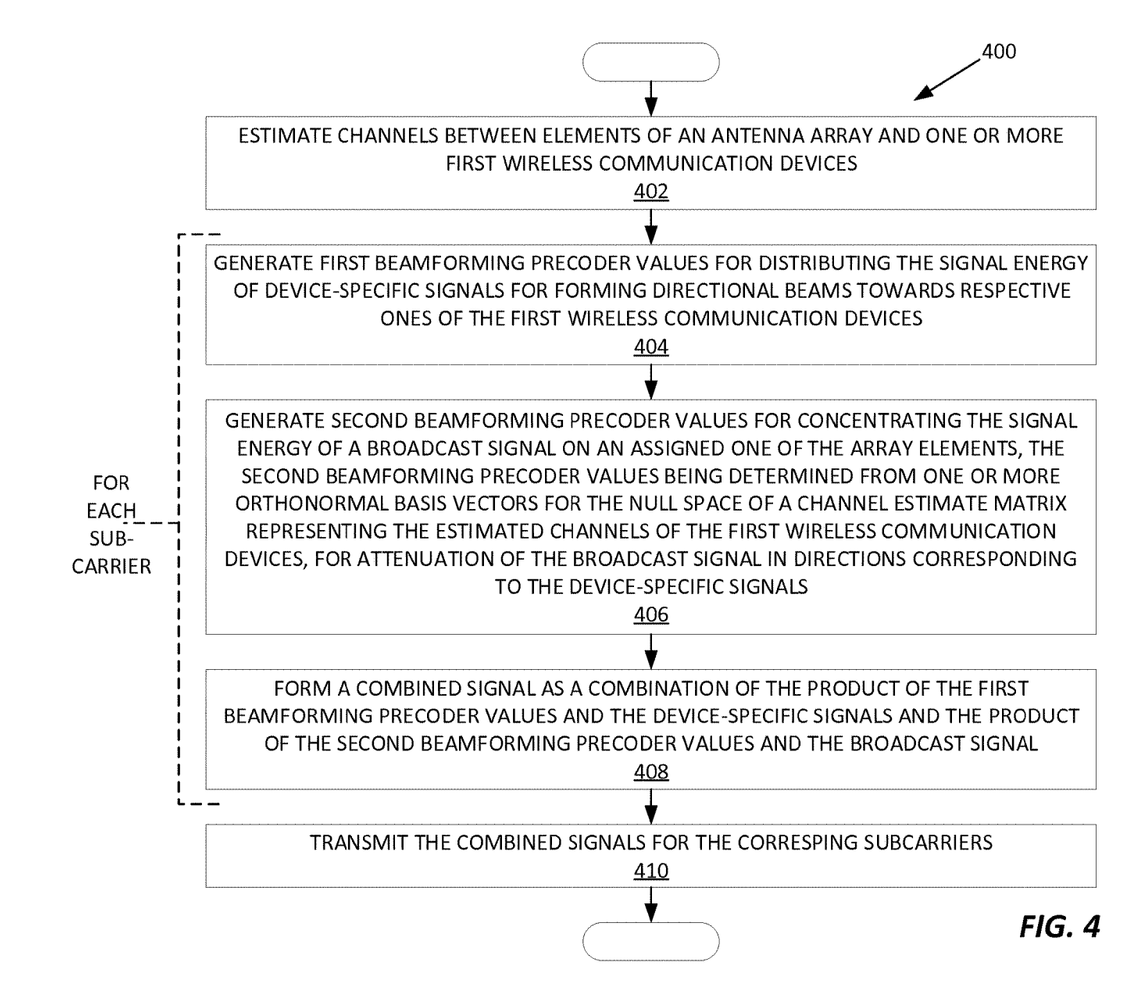
FIG. 4 is a logic flow diagram of one embodiment of a method of operation by a node, such as the one introduced in FIG. 1.

FIG. 4 illustrates a method 400 of operation at a node 12 in a wireless communication network 10. The method includes estimating (Block 402) channels between elements 16 of an antenna array 14 and one or more first wireless communication devices 24 that are targeted for directional transmission of corresponding device-specific signals 22 on subcarriers in a set of subcarriers. For example, the channel estimation is done per subcarrier and is based on the node 12 receiving uplink signal transmissions from the first wireless communication device(s) 24.

For each subcarrier in the set of subcarriers, the method 400 further includes generating (Block 404) first beamforming precoder values for distributing the signal energy of the device-specific signals 22 across the elements 16 of the antenna array 14 for directional transmission of the device-specific signals 22. The first beamforming precoder values are generated from a channel estimate matrix representing the estimated channels.

Further, for each subcarrier, the method 400 includes generating (Block 406) second beamforming precoder values for concentrating the signal energy of a broadcast signal 26 not targeted to any specific wireless communication device 24, 28 on an assigned one of the elements 16 in the antenna array 14. The second beamforming precoder values are determined from one or more orthonormal basis vectors for the null space of the channel estimate matrix, for attenuation of the broadcast signal in directions corresponding to the directional transmission of the device-specific signals.

The method 400 further includes forming (Block 408) a combined signal, for each subcarrier, for transmission from the antenna array 14, as a combination of the product of the first beamforming precoder values and the device-specific signals 22 and the product of the second beamforming precoder values and the broadcast signal 26. Correspondingly, the method 400 includes transmitting (Block 410) the combined signals formed for the corresponding subcarriers in the set of subcarriers from the antenna array 14.

Generating (Block 406) the second beamforming precoder values comprises, for example, for each subcarrier in the set of subcarriers, selecting a respective orthonormal basis vector from a set of orthonormal basis vectors. For example, the method 400 includes selecting respective orthonormal basis vectors from the set in order, in round-robin fashion.

In another example, generating (Block 406) the second beamforming precoder values comprises, for each subcarrier in the set of subcarriers, calculating a linear combination of orthonormal basis vectors from a set of orthonormal basis vectors for the null space of the channel estimate matrix that maximizes the concentration of broadcast signal energy on the assigned element 16, without exceeding a transmit power limit applicable to each subcarrier. This approach can be understood as finding the linear combination of orthonormal basis vectors that yields the highest concentration of broadcast signal energy for the subcarrier on the assigned antenna element 16, without violating applicable transmit power limits. The determination of that linear combination may be performed as described earlier herein for the node 12.

In yet another example, generating (Block 406) the second beamforming precoder values comprises, for each subcarrier, tentatively assigning the subcarrier to each element 16 of the antenna array 14. For each tentatively-assigned element 16, this variation of the method 400 includes determining a linear combination of orthonormal basis vectors from a set of orthonormal basis vectors for the null space of the channel estimate matrix that maximizes the concentration of broadcast signal energy on the tentatively-assigned element 16, without exceeding a transmit power limit applicable to each subcarrier. Once such processing is done for all possible subcarrier-to-antenna-element assignments, the tentative assignments are finalized by assigning subcarriers to elements 16 in a way that maximizes the sum of the broadcast signal energy concentrations determined for the tentative assignments. Such finalization comprises, for example, solving the subcarrier-to-element assignment problem by applying a combinatorial optimization algorithm, which may be applied in such a way that yields substantially the same number of subcarriers assigned to each element 16 in the antenna array 14. This approach results in each element 16 radiating substantially the same average power with respect to the broadcast signal 26.

For a more detailed example, consider a scenario involving Orthogonal Frequency Division Multiplexing on the downlink (DL) from a node 12, using Multi-User (MU) MIMO with N subcarriers, with simultaneous transmission to K D-UEs and L B-UEs. Here, the term "D-UE" denotes a "data UE" or "data user equipment," and it can be understood by way of example as referring to the first wireless communication devices 24 introduced in FIG. 1—i.e., wireless communication devices 24 that are targeted by device-specific signals 22 that are directionally transmitted to them. In that regard, the "D" annotation can also be understood as indicating "device-specific." Correspondingly, the term "B-UE" denotes a "broadcast UE" or "broadcast user equipment," and it can be understood by way of example as referring to the second wireless communication devices 28 introduced in FIG. 1—i.e., wireless communication devices 28 that are not targeted by the device-specific signals 22.

The node 12, also referred to as a "base station" or "BS," includes M antenna elements 16 in an antenna array 14, or, more broadly, can be understood as having M antennas for MU-MIMO transmission. In this example scenario, M is large, which here means at least 32 antennas, and each UE is equipped with a single antenna, although it should be appreciated that these teachings straightforwardly generalize to UEs with more than one antenna. The goal is to transmit data to the K D-UEs, while simultaneously transmitting a certain broadcast signal to the L B-UEs. In the context of FIG. 1, the device-specific signals 22 can be understood as the data transmissions and the broadcast signal 26 can be understood as the desired broadcast transmission.

One may assume that the BS has an estimate of the K uplink (UL) channels from each D-UE, which is a conventional and important assumption in the context of Massive MIMO systems, because the UL channel estimates are used to create accurate beams in the downlink (DL). For example, assuming Time Division Duplex (TDD) operation of the DL and the UL on the same frequencies, the DL and UL channels are reciprocal, and DL beamforming may be based on channel estimates determined from the reception of UL signals at the BS from the D-UEs. Notably, there is no need for the BS to know the channels to the B-UEs, because they are not expected to receive directional, device-specific signals from the BS.

Denote the composite K×M DL channel to the D-UEs on OFDM subcarrier j by $H_j^{D-UEs}$. "Composite channel" here means that each row in $H_j^{D-UEs}$ is the channel from the BS antenna array to a certain D-UE. Similarly, let $H_j^{B-UEs}$ be the composite L×M DL channel on subcarrier j to all B-UEs. After training, the BS has an estimate $\hat{H}_j^{D-UEs} \triangleq H_j^{D-UEs} + N_j$ of the K×M DL channel (to all D-UEs) on subcarrier j, where $N_j$ is measurement noise (typically AWGN). However, there is no assumption that the BS has any estimate of the composite channel $H_j^{B-UEs}$, nor is that estimate needed.

Representing the broadcast signal in the subcarrier domain with the vector $b=[b_1, \ldots, b_N]$, the BS transmits the following vector $x_j$ (a combined signal) from the BS antenna array for subcarrier j:

$$x_j = F_j d_j + w_j b_j,$$

where $F_j$ stands for the precoder (its columns are beams) that is applied for the D-UEs, and $d_j$ is a vector that contains the data symbols intended for the D-UEs, $w_j$ denotes the precoder (a broad beam) that is applied to the broadcast signal 26, and $b_j$ denotes the broadcast signal symbol on subcarrier j. With reference to the earlier nomenclature, then, $F_j$ is an example of the first beamforming precoder values used for beamforming to K first wireless communication devices 24 that are targeted by respective device-specific signals $d_j$, and $w_j$ is an example of the second beamforming precoder values used for transmission of the broadcast signal symbol $b_j$.

The BS is configured to operate such that the following requirements are met: (1) $H_j^{B-UEs} F^j$ is close to the zero matrix, (2) $\hat{H}_j^{D-UEs} w_j$ is the zero vector, and (3) $H_j^{B-UEs} w_j$ results in a vector with elements that are large and substantially the same in magnitude, thereby guaranteeing that all B-UEs receive substantially the same large SNR. The power of $x_j$ should be spread substantially equally among the antenna array elements 16, such that each BS antenna element 16 radiates substantially the same amount of energy.

Since the BS has the estimate $\hat{H}_j^{D\text{-}UEs}$, the precoder $F_j$ will be dependent on that estimate. Due to that relationship, $F_j$ is independent of $H_j^{B\text{-}UEs}$, and $H_j^{B\text{-}UEs}F_j$ can be made to approach the zero matrix by utilizing properties of the Central Limit Theorem (CLT), thus ensuring that requirement (1) above is met. To satisfy requirement (2) above, $w_j$ must lie in the null space of $\hat{H}_j^{D\text{-}UEs}$. Requirement (3) can be satisfied by concentrating as much power in $w_j$ as possible to a single element of $w_j$, i.e., by concentrating as much power as possible on a single element 16 of the BS antenna array 14. The requirement (4) above can be satisfied by making sure that each antenna element 16 is used for concentrating the broadcast signal energy for substantially the same number of subcarriers. One may assume that, on average, the time-domain signal for each antenna element 16 resulting from the subcarrier vectors $F_j d_j$, $j=1, \ldots, N$, is equally distributed across the BS antenna elements 16. The latter assumption holds on average for independent channel realization at the D-UEs and independent data symbols in $d_j$ also represents a common practical assumption.

Now, to find the $w_j$ for subcarrier j that satisfies the requirements (2)-(4) above, one or more embodiments of the BS are configured to solve the following optimization problem.

Let $V_{j,null}^{D\text{-}UEs}$ denote a $M \times (M-K)$ matrix whose columns are an orthonormal basis for the null space of $\hat{H}_j^{D\text{-}UEs}$, where $e_m$ is a row vector with element m being a 1 and other elements being 0. Thus, $e_m$ can be understood as denoting or selecting the m-th antenna element 16 in the array 14 of M antenna elements 16. Assuming the antenna elements 16 in the BS antenna array 14 are ordered or numbered according to a defined scheme, e.g., from 1 to M, $e_1$ corresponds to the first antenna element 16, $e_2$ corresponds to the second antenna element 16, and so on.

From requirement (2) above, it holds that $w_j = V_{j,null}^{D\text{-}UEs} y_j$ for some $(M-K) \times 1$ vector $y_j$. Furthermore, since $V_{j,null}^{D\text{-}UEs}$ is an orthonormal basis, it holds that $\|w_j\|=\|y_j\|$, where $\|.\|$ denotes Frobenius norm. The optimization problem of interest is $$\max_y (e_m V_{j,null}^{D\text{-}UEs} y_j)^H (e_m V_{j,null}^{D\text{-}UEs} y_j)$$

subject to $y_j^H y_j \leq P$.

The solution to the optimization is that $y_j$ is parallel with the row vector $e_m V_{j,null}^{D\text{-}UEs}$, and scaled so that it has power P. In this regard, the power P can be understood as a transmit power limit applicable to each subcarrier j. The above optimization yields the maximized broadcast signal energy concentration for the j-th subcarrier on the m-th antenna element, while still avoiding interference in the beam directions associated with the device-specific signals 22 and adhering to transmit power limits.

What remains, then, is for the BS to decide on which antenna element m that the energy of subcarrier j should be concentrated (i.e., for each subcarrier j, choosing the vector $e_m$ in the above optimization). In one embodiment, the BS simply assigns subcarriers to antenna elements 16, e.g., in order, and selects the orthonormal basis vector that concentrates the most broadcast signal energy on the assigned antenna element 16. In another embodiment, the BS also makes ordered assignments of subcarriers to antenna elements 16, but it finds a linear combination of orthonormal basis vectors that maximizes the broadcast signal energy on the assigned antenna element 16, e.g., according to the above optimization. In yet another embodiment, as elaborated below, the BS optimizes the subcarrier-to-antenna-element assignments in a way that maximizes the sum of the broadcast-signal-energy concentrations for the overall set of antenna elements 16, or for subsets thereof.

As mentioned before, each antenna element 16 should carry substantially the same number of subcarriers—i.e., substantially the same number of subcarriers should be assigned to each antenna element 16 in the above context of concentrating broadcast signal energies, so that all antenna elements 16 radiate substantially the same average power. In an example case, assume that the number of subcarriers N in the overall set of subcarriers is a multiple of the number M of antenna elements 16, i.e., N=Mc for some constant c, so that each antenna element 16 should have c subcarriers concentrated on it.

The optimal way to solve the problem is by applying the "Hungarian" algorithm several times. See, e.g., Kuhn, H. W. (1955), *The Hungarian method for the assignment problem*, Naval Research Logistics, 2: 83-97, and Jonker, R., Volgenat, T., *Improving the Hungarian assignment problem*, Operations Research Letters, Vol. 5, Issue 4, pp. 171-175 (October 1986). The Hungarian algorithm is a combinatorial optimization algorithm and its use yields an "optimal" assignment of subcarriers to antenna elements in the sense that the subcarriers are assigned to antennas in a way that maximizes the sum of the broadcast signal energy concentrations across the different antenna elements.

That is, if the j-th subcarrier is assigned to the m-th antenna element 16 via $e_m$, then the above optimization problem yields second beamforming precoder values $w_j$ that concentrate the broadcast signal energy for the j-th subcarrier on the m-th antenna element. One may denote the resulting optimized energy concentration as $q_{m,j}$. To set up the assignment problem for M antenna elements 16 and N subcarriers, the BS solves the above-detailed optimization problem for each j-th subcarrier, for each antenna element m=1 to M. That is, for each subcarrier j, the BS considers each antenna element m to be a candidate for concentrating the broadcast signal energy of the j-th subcarrier and it "tentatively" assigns the j-th subcarrier to each m-th antenna element and solves the above-described optimization problem, to determine the maximized broadcast signal energy concentration $q_{m,j}$ that would be obtained with the tentative assignment.

Here, it will be understood that $q_{m,j}$ corresponds to the m-th antenna weighting value in $w_j$ computed for the tentative assignment. It will also be appreciated that solving for $w_j$ for each subcarrier j=1 to N, with respect to each antenna element m=1 to M, yields the optimized or maximized broadcast signal energy concentration $q_{m,j}$ for every subcarrier j with respect to every antenna element m, which can be represented in a table or other such data structure, as illustrated in the example data structure shown in FIG. 5. With the complete set of maximized broadcast signal energy concentrations from the tentative assignments, the BS can pick the "best" assignments, e.g., to pick the tentative assignments associated with the highest broadcast signal energy concentrations. In at least one such embodiment, the BS is configured to pick the tentative assignments that maximize the sum of the broadcast signal energy concentrations $q_{m,j}$.

Figure 5:
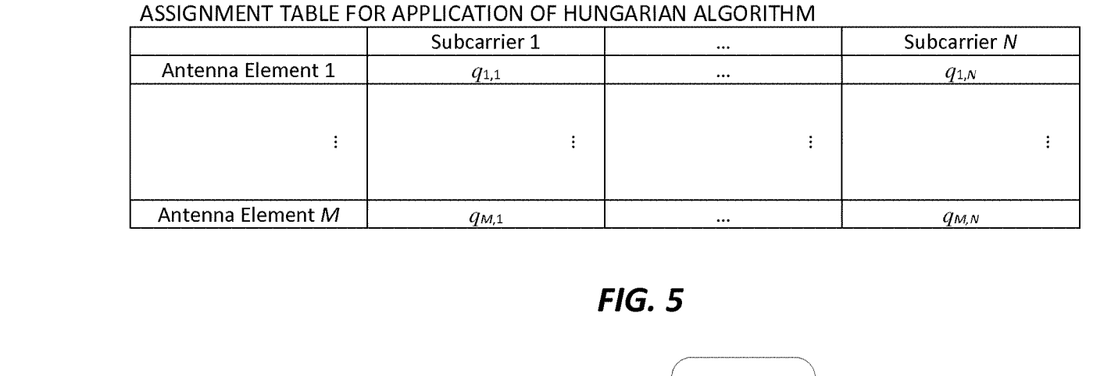
FIG. 5 is a diagram of one embodiment of an assignment table, for use in assigning subcarriers to antenna elements, for broadcast-signal transmission.

In more detail, in the example table shown in FIG. 5, $q_{1,1}$ denotes the broadcast signal energy concentration that would be achieved if subcarrier "1" is concentrated on antenna element "1," $q_{2,1}$ denotes the broadcast signal energy concentration that would be achieved if subcarrier "1" is concentrated on antenna element "2," etc. Here, m ranges from 1 to M, and j ranges from 1 to N, for M antenna elements and N subcarriers.

Assuming N subcarriers, M antenna elements 16, and c=N/M, the BS uses the Hungarian algorithm to assign N/M=c subcarriers to each antenna element 16 in the antenna array 14 in a way that maximizes the sum of the assigned values $q_{m,j}$ in the table of FIG. 5. To better appreciate this approach, consider that some embodiments of the BS orderly assign respective subcarriers to respective antenna elements 16, and then, for each subcarrier, determine a linear combination of orthonormal basis vectors that maximizes the broadcast signal energy concentration for that subcarrier on its assigned antenna element 16. With use of the Hungarian algorithm, the BS determines the broadcast signal energy concentration that would be achieved for each subcarrier with respect to each antenna element 16, and then determines the "best" subcarrier-to-antenna-element assignments to actually use, based on determining which assignments maximize the sum of the broadcast signal energy concentrations.

The BS accomplishes such optimization by applying the Hungarian algorithm c times to the table seen in FIG. 5. Each time the BS applies the Hungarian algorithm, it removes the columns (subcarriers) that the Hungarian algorithm returns (assigns), which correspond to the optimal assignment of subcarriers to antenna elements 16 for the returned subset of c subcarriers. The procedure repeats until all subcarriers are assigned to antenna elements 16. Those skilled in the art will appreciate that the contemplated optimal assignment algorithm can be applied even in cases where the number of subcarriers is not an integer multiple of the number of antenna elements 16, and the overall process and corresponding goals hold, even in cases where it is not possible to assign the exact same number of subcarriers to each antenna element 16.

Figure 6:
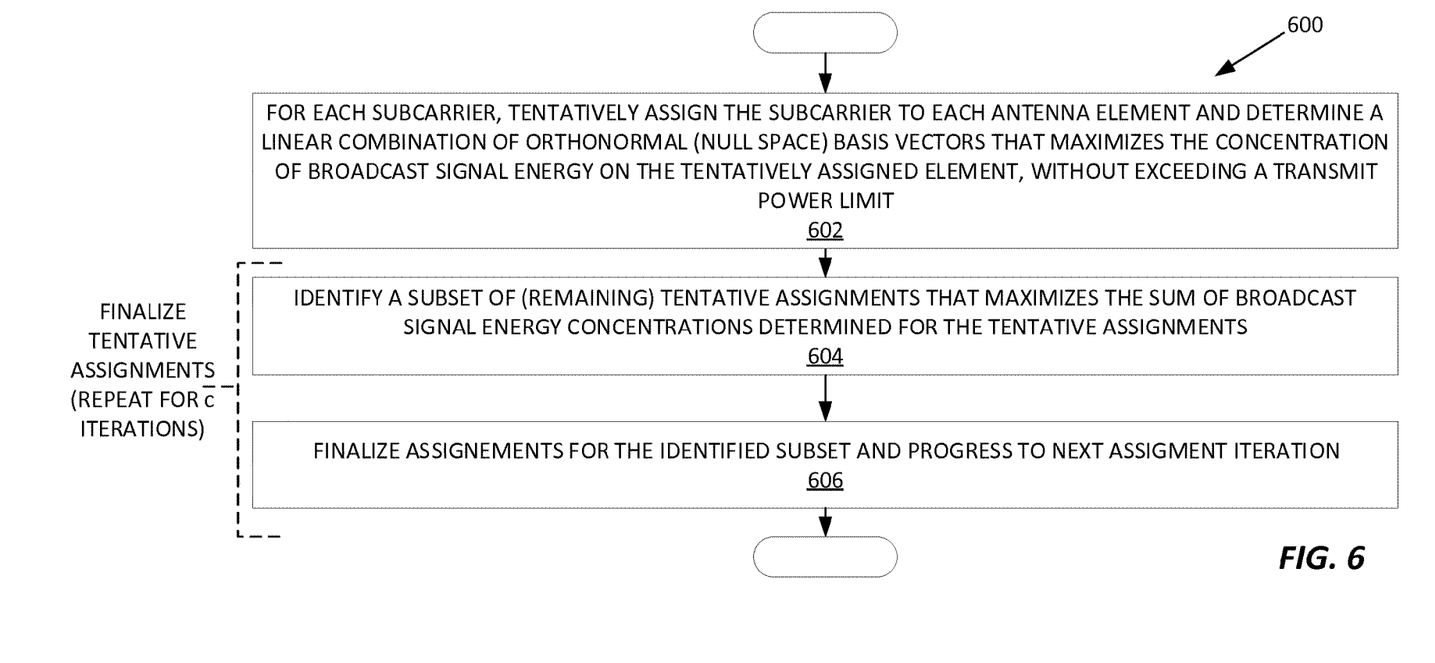
FIG. 6 is a logic flow diagram of another embodiment of a method of operation by a node, such as the one introduced in FIG. 1.

FIG. 6 illustrates a method 600 that generalizes the above example method of optimizing the subcarrier-to-antenna-element assignments via the application of combinatorial assignment algorithm. According to FIG. 6, the method 600 includes, for each subcarrier, tentatively assigning (Block 602) the subcarrier to each antenna element 16 and determining a linear combination of orthonormal basis vectors that maximizes the concentration of broadcast signal energy on the tentatively assigned antenna element 16. The method 600 further finalizing the tentative assignments by iteratively identifying the optimal assignments for the subcarriers i.e., finding the optimal assignments (Block 604) for a first or next subset, finalizing (Block 606) those optimal assignments, removing those assigned subcarriers from the remaining set of subcarriers awaiting assignment, and solving the optimal assignment problem again (Blocks 604 and 606), for the remaining set of subcarriers.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of operation at a node in a wireless communication network, the method comprising:
   estimating channels between elements of an antenna array and one or more first wireless communication devices that are targeted for directional transmission of corresponding device-specific signals on subcarriers in a set of subcarriers;
   for each subcarrier in the set of subcarriers:
      generating first beamforming precoder values for distributing the signal energy of the device-specific signals across the elements of the antenna array for directional transmission of the device-specific signals, the first beamforming precoder values generated from a channel estimate matrix representing the estimated channels;
      generating second beamforming precoder values for concentrating the signal energy of a broadcast signal not targeted to any specific wireless communication device on an assigned one of the elements comprising the antenna array, the second beamforming precoder values being determined from one or more orthonormal basis vectors for the null space of the channel estimate matrix, for attenuation of the broadcast signal in directions corresponding to the directional transmission of the device-specific signals, generating the second beamforming precoder values for concentrating the signal energy of the broadcast signal on the assigned one of the elements comprising the antenna array comprises, for each subcarrier in the set of subcarriers, selecting a respective orthonormal basis vector from a set of orthonormal basis vectors; and
      forming a combined signal for transmission from the antenna array, as a combination of the product of the first beamforming precoder values and the device-specific signals and the product of the second beamforming precoder values and the broadcast signal; and
   transmitting the combined signals formed for the corresponding subcarriers in the set of subcarriers from the antenna array.

2. The method of claim 1, wherein, over the set of subcarriers, said selecting of respective orthonormal basis vectors being done in order, in round-robin fashion with respect to the set of orthonormal basis vectors.

3. The method of claim 1, wherein generating the second beamforming precoder values for concentrating the signal energy of the broadcast signal on the assigned one of the elements comprising the antenna array comprises, for each subcarrier in the set of subcarriers, calculating a linear combination of orthonormal basis vectors from a set of orthonormal basis vectors for the null space of the channel estimate matrix that maximizes the concentration of broadcast signal energy on the assigned element, without exceeding a transmit power limit applicable to each subcarrier.

4. The method of claim 3, wherein identifying the linear combination of orthonormal basis vectors comprises determining:

$$\max_y (e_k V^D_{j,null} y_j)^H (e_k V^D_{j,null} y_j)$$

subject to $y_j^H y_j \leq P$, where $e_k$ is a 1×M vector with k representing the assigned element from a total of M elements comprising the antenna array, $V_{j,null}^D$ an M×(M−K) matrix whose columns are an orthonormal basis for the null space of the channel estimate matrix, K denotes the number of one or more first wireless communication devices for which device-specific signals are to be directionally transmitted, P is the transmit power limit, $y_j$ is an (M−K)×1 vector of combining weights to be determined for forming the second beamforming precoder values as a linear combination of basis vectors from $V_{j,null}^D$, the second beamforming precoder values denoted as $w_j$ and given by $$w_j = V_{j,null}^D y_j.$$

5. The method of claim 1, wherein generating the second beamforming precoder values for concentrating the signal energy of the broadcast signal on the assigned one of the elements comprising the antenna array includes determining the assigned one of the elements based on:
for each subcarrier, tentatively assigning the subcarrier to each element of the antenna array and, for each tentatively-assigned element, determining a linear combination of orthonormal basis vectors from a set of orthonormal basis vectors for the null space of the channel estimate matrix that maximizes the concentration of broadcast signal energy on the tentatively-assigned element, without exceeding a transmit power limit applicable to each subcarrier; and
finalizing the tentative assignments by assigning subcarriers to elements in a way that maximizes the sum of the broadcast signal energy concentrations determined for the tentative assignments.

6. The method of claim 5, wherein finalizing the tentative assignments by assigning subcarriers to elements in a way that maximizes the sum of the broadcast signal energy concentrations across the elements comprises solving a subcarrier-to-element assignment problem by applying a combinatorial optimization algorithm.

7. The method of claim 5, further comprising applying the combinatorial optimization algorithm in such a way that yields substantially the same number of subcarriers assigned to each element in the antenna array, so that each element radiates substantially the same average power with respect to the broadcast signal.

8. The method of claim 1,
wherein forming the combined signal comprises forming the combined signal as $$x_j = F_j d_j + w_j b_j$$

where $F_j$ denotes the first beamforming precoder values for the j-th subcarrier in the set of subcarriers, $d_j$ denotes a vector of device-specific symbols for transmission to the one or more first wireless communication devices on the j-th subcarrier, $w_j$ denotes the second beamforming precoder values for the j-th subcarrier, and $b_j$ denotes a broadcast symbol for transmission on the j-th subcarrier;
wherein generating the first beamforming precoder values $F_j$ comprises calculating the first beamforming precoder values based on a composite channel matrix $H_j^D$ representing the composite channel between each first wireless communication device and respective elements in the antenna array; and
wherein generating the second beamforming precoder values comprises selecting a basis vector or a linear combination of basis vectors, from a set of orthonormal basis vectors for the null space of the composite channel matrix $H_j^D$.

9. A node configured for operation in a wireless communication network, the node comprising:
communication circuitry configured for transmitting from an antenna array; and
processing circuitry operatively associated with the communication circuitry and configured to:
estimate channels between elements of the antenna array and one or more first wireless communication devices that are targeted for directional transmission of corresponding device-specific signals on subcarriers in a set of subcarriers;
for each subcarrier in the set of subcarriers:
generate first beamforming precoder values for distributing the signal energy of the device-specific signals across the elements of the antenna array for directional transmission of the device-specific signals, the first beamforming precoder values generated from a channel estimate matrix representing the estimated channels;
generate second beamforming precoder values for concentrating the signal energy of a broadcast signal not targeted to any specific wireless communication device on an assigned one of the elements comprising the antenna array, the second beamforming precoder values being determined from one or more orthonormal basis vectors for the null space of the channel estimate matrix, for attenuation of the broadcast signal in directions corresponding to the directional transmission of the device-specific signals, generating the second beamforming precoder values for concentrating the signal energy of the broadcast signal on the assigned one of the elements comprising the antenna array by, for each subcarrier in the set of subcarriers, selecting a respective orthonormal basis vector from a set of orthonormal basis vectors; and
form a combined signal for transmission from the antenna array, as a combination of the product of the first beamforming precoder values and the device-specific signals and the product of the second beamforming precoder values and the broadcast signal; and
transmit the combined signals formed for the corresponding subcarriers in the set of subcarriers from the antenna array.

10. The network node of claim 9, wherein, over the set of subcarriers, the processing circuitry is configured to select respective orthonormal basis vectors in order, in round-robin fashion with respect to the set of orthonormal basis vectors.

11. The network node of claim 9, wherein the processing circuitry is configured to generate the second beamforming precoder values for concentrating the signal energy of the broadcast signal on the assigned one of the elements comprising the antenna array by, for each subcarrier in the set of subcarriers, calculating a linear combination of orthonormal basis vectors from a set of orthonormal basis vectors for the null space of the channel estimate matrix that maximizes the concentration of broadcast signal energy on the assigned element, without exceeding a transmit power limit applicable to each subcarrier.

12. The network node of claim 11, wherein the processing circuitry is configured to identify the linear combination of orthonormal basis vectors based on determining:

$$\max_{y} (e_k V_{j,null}^D y_j)^H (e_k V_{j,null}^D y_j)$$

subject to $y_j^H y_j \leq P$, where $e_k$ is a 1×M vector with k representing the assigned element from a total of M elements comprising the antenna array, $V_{j,null}^D$ is an M×(M−K) matrix whose columns are an orthonormal basis for the null space of the channel estimate matrix, K denotes the number of one or more first wireless communication devices for which device-specific signals are to be directionally transmitted, P is the transmit power limit, $y_j$ is an (M−K)×1 vector of combining weights to be determined for forming the second beamforming precoder values as a linear combination of basis vectors from $V_{j,null}^D$, the second beamforming precoder values denoted as $w_j$ and given by $$w_j = V_{j,null}^D y_j.$$

13. The network node of claim 9, wherein the processing circuitry is configured to generate the second beamforming precoder values for concentrating the signal energy of the broadcast signal on the assigned one of the elements comprising the antenna array based on determining the assigned one of the elements, by:

for each subcarrier, tentatively assigning the subcarrier to each element of the antenna array and, for each tentatively-assigned element, determining a linear combination of orthonormal basis vectors from a set of orthonormal basis vectors for the null space of the channel estimate matrix that maximizes the concentration of broadcast signal energy on the tentatively-assigned element, without exceeding a transmit power limit applicable to each subcarrier; and finalizing the tentative assignments by assigning subcarriers to elements in a way that maximizes the sum of the broadcast signal energy concentrations determined for the tentative assignments.

14. The network node of claim 13, wherein the processing circuitry is configured to finalize the tentative assignments by assigning subcarriers to elements in a way that maximizes the sum of the broadcast signal energy concentrations across the elements, based on solving a subcarrier-to-element assignment problem by applying a combinatorial optimization algorithm.

15. The network node of claim 13, wherein the processing circuitry is configured to apply the combinatorial optimization algorithm in such a way that yields substantially the same number of subcarriers assigned to each element in the antenna array, so that each element radiates substantially the same average power with respect to the broadcast signal.

16. The network node of claim 9, wherein the processing circuitry is configured to:

form the combined signal as $$x_j = F_j d_j + w_j b_j$$

where $F_j$ denotes the first beamforming precoder values for the j-th subcarrier in the set of subcarriers, $d_j$ denotes a vector of device-specific symbols for transmission to the one or more first wireless communication devices on the j-th subcarrier, $w_j$ denotes the second beamforming precoder values for the j-th subcarrier, and $b_j$ denotes a broadcast symbol for transmission on the j-th subcarrier;

generate the first beamforming precoder values $F_j$ by calculating the first beamforming precoder values based on a composite channel matrix $H_j^D$ representing the composite channel between each first wireless communication device and respective elements in the antenna array; and generate the second beamforming precoder values by selecting a basis vector or a linear combination of basis vectors, from a set of orthonormal basis vectors for the null space of the composite channel matrix $H_j^D$.

* * * * *